5722X
Sheet 1. 2 Sheets
Davis & Lord,
Cooking Stove,
Patented Nov. 23, 1829.
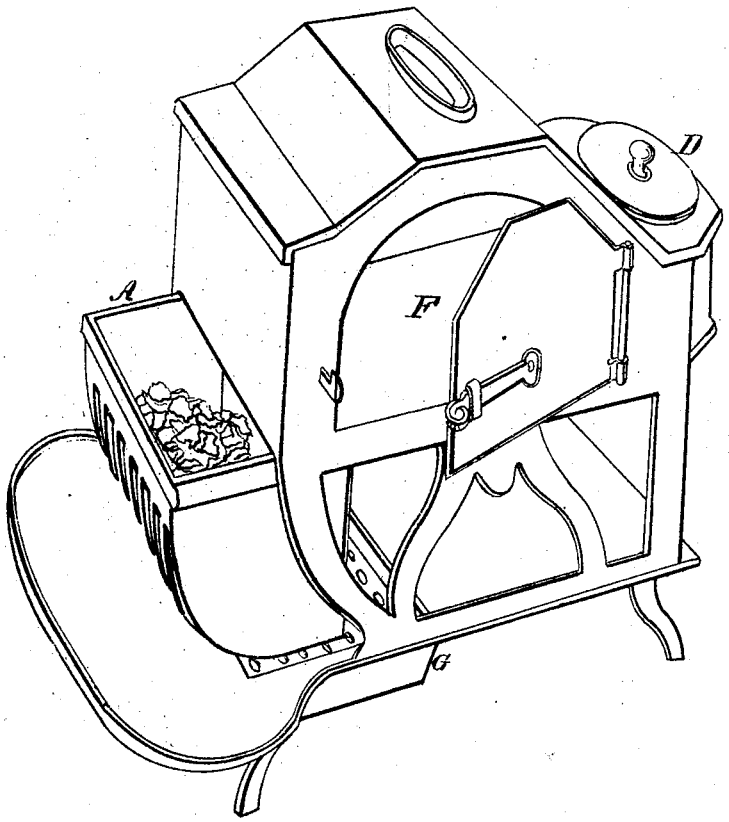

5722X
Sheet 2 2 Sheets
Davis & Lord,
Cooking Stove,
Patented Nov. 23, 1829.
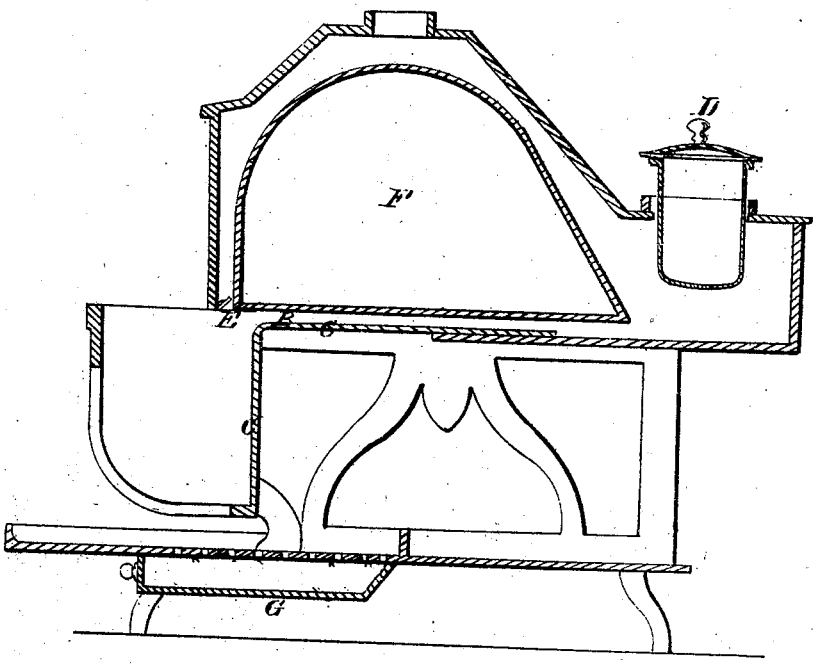

United States Patent Office

PTO - BOYERS, PA Duty Station

MISSING PAGE TEMPORARY NOTICE

PATENT # 5722X FOR ISSUE DATE 11-23-1829

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All text.

Data Conversion Operation

Boyers, Pa